United States Patent [19]

Honda et al.

[11] Patent Number: 5,676,814

[45] Date of Patent: *Oct. 14, 1997

[54] METHOD OF PRODUCING CONDUCTIVE POLYMER COMPOSITES

[75] Inventors: Satoshi Honda; Hideaki Matsuura, both of Niihama, Japan

[73] Assignee: Sumitomo Chemical Company, Limited, Osaka-fu, Japan

[*] Notice: The term of this patent shall not extend beyond the expiration date of Pat. No. 5,281,327.

[21] Appl. No.: 413,117

[22] Filed: Mar. 29, 1995

[30] Foreign Application Priority Data

Mar. 30, 1994 [JP] Japan .................................. 6-061016

[51] Int. Cl.$^6$ ...................... C25D 1/00; C25D 5/22; C04B 35/00; B28B 7/22
[52] U.S. Cl. ................... 205/67; 205/70; 205/78; 205/93; 205/198; 205/317; 264/104; 264/255
[58] Field of Search .................. 205/67, 70, 78, 205/93, 198, 317, 414, 423, 438; 264/104, 255

[56] References Cited

U.S. PATENT DOCUMENTS

| | | | |
|---|---|---|---|
| 4,468,291 | 8/1984 | Naarmann et al. | 204/13 |
| 4,557,807 | 12/1985 | Preston et al. | 204/4 |
| 4,699,804 | 10/1987 | Miyata et al. | 437/176 |
| 5,281,327 | 1/1994 | Honda et al. | 205/198 |

FOREIGN PATENT DOCUMENTS

| | | | |
|---|---|---|---|
| 0144127 | 4/1984 | European Pat. Off. | C25D 13/08 |
| 0 144 127 | 6/1985 | European Pat. Off. | |
| 613742 | 1/1986 | Japan | B32B 7/02 |
| 61-126140 | 6/1986 | Japan | C08J 3/20 |
| 62-174399 | 7/1987 | Japan | C25D 13/08 |

OTHER PUBLICATIONS

Journal of the Chemical Society, Chemical Communications, No. 13, 1984, pp. 817 818 (no month).

*Primary Examiner*—Kathryn L. Gorgos
*Assistant Examiner*—Edna Wong
*Attorney, Agent, or Firm*—Sughrue, Mion, Zinn, Macpeak & Seas, PLLC

[57] ABSTRACT

Disclosed is a method of producing an electrically conductive polymer composite comprising a general-purpose resin layer and an electrically conductive layer, wherein the conductive layer is formed on at least one surface of the general-purpose resin layer, the method comprising the steps of forming the conductive layer on at least one internal surface of a mold, introducing into the mold a raw solution of the general-purpose resin comprising a monomer polymerizable without condensation reaction, and subjecting said monomer to polymerization in said mold to provide the general-purpose resin layer.

11 Claims, 2 Drawing Sheets

METHOD OF PRODUCING CONDUCTIVE POLYMER COMPOSITES

FIELD OF THE INVENTION

The present invention relates to a method of producing electrically conductive polymer composites.

PRIOR ART

Heretofore a number of proposals have been made for the production of a composite comprising a general-purpose resin and an electrically conductive polymer. By way of illustration, Japanese Unexamined Patent Publication (Kokai) No. 157522/1986 teaches a technology for depositing an electrically conductive polymer layer on the surface of a general-purpose resin, which comprises contacting an oxidizing agent-containing general-purpose resin with a solution or vapor of a monomer having the property to form a conductive polymer on oxidative polymerization.

Japanese Unexamined Patent Publication (Kokai) No. 105532/1985 discloses a technology for producing a conductive polymer composite, which comprises carrying out an electrolysis using an anode coated with a general-purpose resin and a cathode in an electrolytic solution containing a monomer capable of providing a conductive polymer on electrolytic polymerization to thereby produce a conductive polymer in said general-purpose resin.

Japanese Unexamined Patent Publication (Kokai) No. 3742/1986 discloses a technology for producing a conductive polymer composite, which comprises impregnating a sheet of general-purpose resin with an electrolytically polymerizable monomer solution and carrying out an electrolytic polymerization reaction using a pair of electrodes abutted against both sides of the sheet.

EP-A1-0560283 discloses a technology for producing a conductive polymer composite, which comprises the steps of introducing into a mold a solution containing a monomer component (a) which is polymerizable without condensation reaction, a monomer (b) which is capable of undergoing electrolytic polymerization to give a conductive polymer and an electrolyte, electrolytically polymerizing the component (b) and thereafter subjecting the component (a) to polymerization.

However, the technology described in Japanese Unexamined Patent Publication (Kokai) No. 157522/1986 is disadvantageous in that it is difficult to control the conductive polymer content of the composite and thickness of the conductive polymer layer.

By the technology taught by Japanese Unexamined Patent Publication (Kokai) No. 105532/1985, only composites in film form can be manufactured and it is difficult to impart sufficient electrical conductivity to the surface of thick general-purpose resin products.

The technology according to Japanese Unexamined Patent Publication (Kokai) No. 3742/1986, wherein a sheet of general-purpose resin is impregnated with an electrolytically polymerizable monomer solution, is disadvantageous in that the starting resin sheet must, for example, be provided with adequate porosity beforehand but such treatment sacrifices the intrinsic mechanical strength and other properties of the general-purpose resin.

Although it has advantages described in EP-A1-0560283, according to the research of the present inventors, the polymer composite prepared by the method of EP-A1-0560283 tends to have a drawback that the composite becomes colored or has low transparency, presumably because a trace amount of the unreacted monomer remains in the electrically conductive polymer obtained by electrolytic polymerization.

SUMMARY OF THE INVENTION

An object of the present invention is to provide a novel method of producing a composite comprising a general-purpose resin and an electrically conductive polymer without detracting from the inherent properties of the general-purpose resin, such as mechanical strength and transparency, which technology allows the production of conductive polymer composites in various shapes with a great freedom of choice in the thickness of the conductive layer.

The present invention provides a method of producing an electrically conductive polymer composite comprising a general-purpose resin layer and an electrically conductive layer comprising a conductive polymer, wherein the conductive layer is formed on at least one side of the general-purpose resin layer, the method comprising the steps of forming the conductive layer on at least one internal surface of a mold, introducing into the mold a raw solution of the general-purpose resin comprising a monomer polymerizable without condensation reaction, and subjecting said monomer to polymerization in said mold to provide the general-purpose resin layer.

DETAILED DESCRIPTION OF THE INVENTION

The conductive polymer composite according to the present invention comprises a general-purpose resin layer and a conductive layer formed on at least one surface of the general-purpose resin layer. More specifically, the composite comprises a general-purpose resin layer formed by polymerizing a monomer which is polymerizable without condensation reaction and a conductive layer formed on at least one side of the general-purpose resin layer.

The thickness (I) of the general-purpose resin layer and the thickness (II) of the electrically conductive layer may be suitably selected from a wide range. Generally, the ratio of the thickness of the conductive layer to the thickness of the general-purpose resin layer (II:I) is in the range of about 0.0000001:1 to 1:1.

BRIEF DESCRIPTION OF THE DRAWINGS

The method according to the present invention will be schematically described below with reference to FIGS. 1 through 4.

The method of the invention can be carried out in various ways. Preferably, the method of the invention is conducted as follows.

Figure 1:
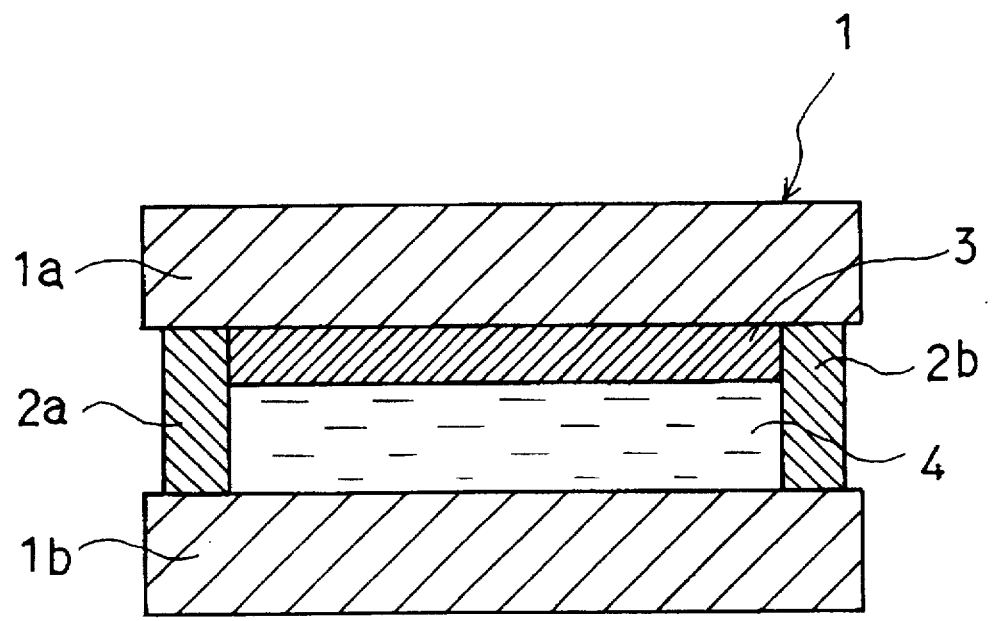
FIG. 1 is a crosssectional view of the mold and shows the status on formation of the layer or film of a conductive polymer on the internal surface of a wall of the mold, after which the remaining cavity of the mold has been filled with the raw solution of the general-purpose resin.
Figure 3:
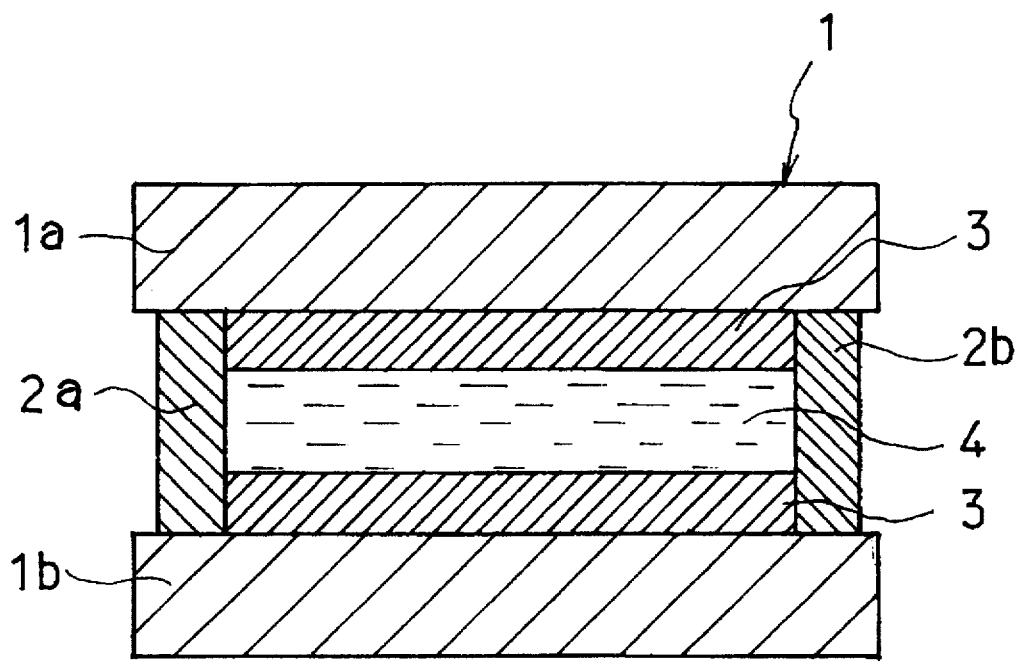
FIG. 3 is a crosssectional view of the mold and shows the status on formation of the layer or film of a conductive polymer on the internal surface each of the two opposite sides of the mold, after which the remaining cavity of the mold has been filled with the raw solution of the general-purpose resin.

First, said conductive layer is formed on the internal surface of the mold 1, i.e., on the internal surface of frame plate 1a, as shown in FIG. 1, or alternatively on the internal surface each of frame plates 1a and 1b of the mold 1, as shown in FIG. 3. The method of forming the conductive layer will be described later in more detail.

Then, the raw solution of general-purpose resin 4 comprising a monomer polymerizable without condensation reaction is introduced into and preferably fills up the cavity of the mold 1, and said monomer is subjected to polymerization in said mold 1. In this manner, a general-purpose resin layer 5 composed of the general-purpose resin is formed in intimate contact with said conductive layer 3 to give the conductive polymer composite of the invention.

Figure 2:
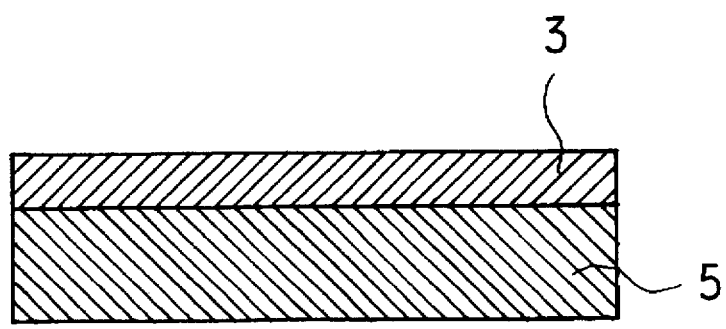
FIG. 2 shows the product conductive polymer composite comprising a general-purpose resin layer and a conductive layer formed on one side of the general-purpose resin layer.
Figure 4:
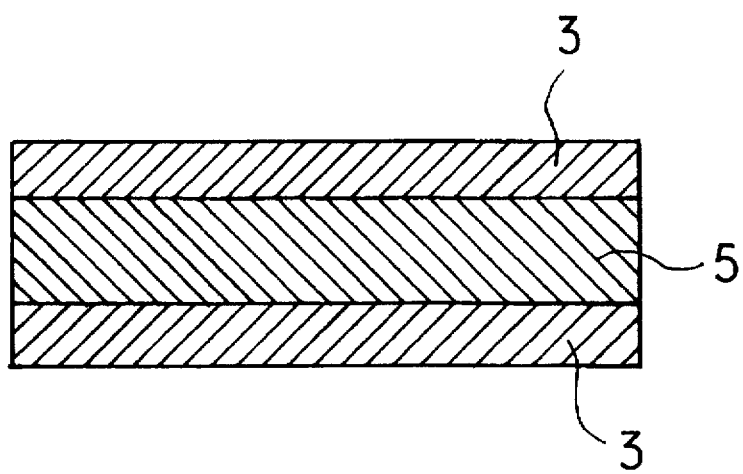
FIG. 4 shows the product conductive polymer composite comprising a general-purpose resin layer and two conductive layers, one conductive layer being formed on one side of the general-purpose resin layer and the other conductive layer being formed on the other side of the general-purpose resin layer.

Then, the mold is disassembled to take out the resulting conductive polymer composite, as shown in FIGS. 2 and 4.

According to the embodiment shown in FIGS. 1 and 2, the resulting composite comprises a general-purpose resin layer 5 and a conductive layer 3 formed on one side of said general-purpose resin layer 5. According to the embodiment shown in FIGS. 3 and 4, the resulting composite comprises a general-purpose resin layer 5 and two conductive layers 3 and 3, one being formed on the front side of said general-purpose resin layer 5 and the other being formed on the rear side thereof.

Mold to be used

A preferred example of the mold to be used in the invention is illustrated in FIG. 1, which shows a crosssectional view of the mold. This mold comprises a frame plate 1a and another frame plate 1b and gaskets 2a and 2b interposed between said frame plates 1a and 1b. The cavity of the mold 1 is defined by said frame plates 1a and 1b and gaskets 2a and 2b. The end sides of the mold are closed with the gaskets that are similar to said gaskets 2a and 2b.

The mold used in the invention is the one that has the inside shape or the shape of the cavity which corresponds to the desired shape of the resulting molded article, i.e., the conductive polymer composite of the invention. Also the mold should allow heating, cooling or UV irradiation that is suitably used for polymerizing or curing raw solution of the general-purpose resin.

For example, if the desired product is to have a plate shape, a cell comprising two plates and gaskets interposed between the two plates can be used as the mold. The configuration or the size and the shape of the plates and the distance between the plates can be freely selected according to the desired product shape, size and thickness, so that a composite having any desired shape can be successfully fabricated by the method of the present invention.

Examples of the material for the mold include inorganic glass, metals such as stainless steel and aluminum, ceramics, and various synthetic resins.

When, for forming a conductive layer on the inside surface of the mold, electrolytic polymerization is conducted using the constituent components of the mold as the electrodes, as will be described later, examples of the material of such mold are those which allow passage of an electric current through an electrolytic solution, and include various metals such as stainless steel, copper and aluminum. Examples thereof further include those prepared by depositing, on a substrate such as a plate made of an inorganic glass, ceramics or various synthetic resin, one or more of the above-exemplified metals, one or more of other metals such as platinum, gold and palladium, or one or more of conductive metal oxides such as tin oxide and indium oxide, by a conventional method such as plating, vapor deposition, sputtering or the like. Specific examples thereof include ITO (indium tin oxide)-clad glass plates.

Conductive layer

The conductive layer or film comprising a conductive polymer according to the invention is not specifically limited, but is preferably a layer or film of an electrically conductive polymer, particularly a layer or film composed of a conjugative polymer having, as the molecular skeleton, a conjugated system wherein carbon-carbon or heteroatom-containing double or triple bonds are arranged alternately with single bonds.

Examples of such conjugative polymers include those prepared by polymerizing a monomer which forms an electrically conductive polymer.

As such monomer, there may be mentioned acetylene, five-membered heterocyclic compounds which may have 1 to 3 (particularly 1 or 2) substituents on the ring, aromatic compounds, particularly six-membered aromatic compounds, optionally having 1 to 3 (particularly 1 or 2) substituents on the ring or rings, and the like.

Examples of said five-membered heterocyclic compounds are pyrrole, thiophene, furan, selenophene, tellurophene, isothianaphthene and the like. Examples of said aromatic compounds are benzene, biphenyl, naphthalene, anthracene, azulene, pyrene, carbazole, pyridazine, aniline, phenol, thiophenol and the like, among which those having at least one six-membered aromatic ring are preferred.

Examples of the substituents on the ring or rings are an alkyl group, particularly a $C_1$–$C_{30}$ alkyl group, a halogen atom, a hydroxyl group, a carboxyl group, an alkylene oxide group, particularly a $C_1$–$C_{30}$ alkylene oxide group, an oxyalkyl group, particularly a $C_1$–$C_{30}$ oxyalkyl group, and an alkylsulfonic acid group, particularly a $C_1$–$C_{30}$ alkylsulfonic acid group.

Preferred among them are five-membered heterocyclic compounds. In particular, unsubstituted pyrrole and pyrroles substituted with 1–3 (preferably 1 or 2) of the above-exemplified substituents are particularly preferred.

The foregoing monomers can be used alone or in combination.

Examples of such conjugative polymers include polyacetylenes, polymers of a five-membered heterocyclic compound which may have one or more of the above substituents (particularly 1–3, preferably 1 or 2 substituents) on the ring structure, such as polypyrrole, polyalkylpyrrole, polythiophene, polyalkylthiophene, polyisothianaphthene, polythienylenevinylene, polyfuran and polyselenophene; polymers of an aromatic compound, particularly of a six-membered aromatic compound, which may have one or more of the above substituents (particularly 1–3, preferably 1 or 2 substituents) on the ring structure, such as polyaniline, polyparaphenylene, polyparaphenylenevinylene, polymethoxyphenylenevinylene, polyphenylene sulfide, polyphenylene oxide, polyanthracene, polynaphthalene, polypyrene and polyazulene; and those prepared by doping the above conjugative polymers.

It is preferable that the above conjugative polymers are doped, because the doped polymers generally have higher electrical conductivity.

Examples of dopant are donor-type dopants, e.g., alkali and alkaline earth metals such as Li, Na, K, Ca or Sr; as well as acceptor-type dopants, e.g., halogens such as $Cl_2$, $Br_2$ or $I_2$, Lewis acids such as $PF_5$, $AsF_5$ or $BF_3$, protonic acids such as HF, HCl, $HNO_3$, $H_2SO_4$, $HClO_4$ or $CF_3SO_3H$, transition metal compounds such as $FeCl_3$, FeOCl, $TiCl_4$, $WCl_5$ or SnCl$_4$, electrolyte anions such as Cl$^-$, Br$^-$, I$^-$, ClO$_4^-$, PF$_6^-$, BF$_4^-$ or AsF$_6^-$.

There is no specific restriction on the method of doping, and the doping can be carried out by conventional methods such as chemical doping method wherein the conjugative polymer is contacted with a vapor or a solution of a dopant or electrochemical doping method wherein an electrical voltage is applied using the conductive polymer as an electrode.

When, for forming a conductive layer on the inside surface or surfaces of the mold, electrolytic polymerization is conducted using a solution of a monomer of a conductive polymer, an electrolyte and a solvent and also using the constituent components of the mold as the electrodes, the resulting conductive layer is doped with the electrolyte ion.

The foregoing conjugative polymers can be prepared by conventional methods, such as addition polymerization method using a suitable catalyst at a suitable temperature, electrolytic polymerization method, and a method comprising synthesizing a conductive polymer precursor and polymerizing the precursor.

These methods are described, for example, in "Dodensei Koubunshi (Conductive Polymer)" edited by Naoya OGATA, published by Kodansha Publishing Company, Limited, Feb. 10, 1990, pp. 51–94.

As the preferred method of forming a conductive layer on the internal surface or surfaces of the mold, there can be mentioned the following methods.

(1) One of the method comprises the steps of dissolving a conductive polymer in a solvent, applying the solution to the internal wall surface or surfaces of the mold, and evaporating the solvent at normal pressure or under reduced pressure to thereby form a conductive layer.

In this method, the solvent can be any solvent that is capable of dissolving the conductive polymer. Examples of the solvent are organic solvents such as methylene chloride, chloroform, dimethylformamide, dimethylacetamide, dimethyl sulfoxide and propylene carbonate, water, etc. The concentration of the conductive polymer solution is not particularly limited, but is preferably such a concentration that the viscosity of the resulting solution will be suitable for applying the solution to said internal surface.

The coating amount of the conductive polymer solution is also suitably selected from a wide range, and the conductive polymer solution is usually applied in an amount effective for forming a conductive layer having a thickness required according to the intended use of the product conductive polymer composite.

(2) Another method of forming a conductive layer comprises the steps of dissolving said monomer capable of providing a conductive polymer and an electrolyte in a solvent and subjecting the resulting electrolytic solution to electrolytic polymerization using as the electrodes a component or components of the mold such as metal plates, ITO-clad glass plates or the like.

The monomer capable of undergoing electrolytic polymerization to provide a conductive polymer is a compound which is capable of being polymerized upon oxidation or reduction to form an electrically conductive polymer.

As such monomer, there may be mentioned five-membered heterocyclic compounds which may have 1 to 3 (particularly 1 or 2) substituents on the ring, aromatic compounds, particularly six-membered aromatic compounds, optionally having 1 to 3 (particularly 1 or 2) substituents on the ring or rings, and the like.

Examples of said five-membered heterocyclic compounds are pyrrole, thiophene, furan, selenophene, tellurophene, isothianaphthene and the like. Examples of said aromatic compounds are benzene, biphenyl, naphthalene, anthracene, azulene, pyrene, carbazole, pyridazine, aniline and the like, among which those having at least one six-membered aromatic ring are preferred.

Examples of the substituents on the ring or rings are an alkyl group, particularly a $C_1$–$C_{30}$ alkyl group, a halogen atom, a hydroxyl group, a carboxyl group, an alkylene oxide group, particularly a $C_1$–$C_{30}$ alkylene oxide group, an oxyalkyl group, particularly a $C_1$–$C_{30}$ oxyalkyl group, and an alkylsulfonic acid group, particularly a $C_1$–$C_{30}$ alkylsulfonic acid group.

Preferred among them are five-membered heterocyclic compounds. In particular, unsubstituted pyrrole and pyrroles substituted with 1–3 (preferably 1 or 2) of the above-exemplified substituents are particularly preferred.

The foregoing monomers can be used alone or in combination.

The electrolyte is used for allowing electric current to pass through the electrolytic solution during the electrolytic polymerization of the monomer which is capable of providing a conductive polymer on said electrolytic polymerization.

Examples of the electrolyte are inorganic ion salts such as LiClO$_4$, LiBF$_4$, LiCF$_3$SO$_3$, LiPF$_6$, LiAsF$_6$ and AgClO$_4$; protonic acid salts such as sodium alkylsulfonate, particularly $C_1$–$C_{20}$ alkylsulfonate, and sodium alkylbenzenesulfonate, particularly ($C_1$–$C_{20}$ alkyl) benzenensulfonate; organic quaternary ammonium salts such as (C$_2$H$_5$)$_4$NClO$_4$; polymer salts such as sodium polymethacrylate; and other compounds such as protonic acids and esters. These electrolytes can be used alone or in combination.

The solvent of the electrolytic solution can be any solvent that is capable of dissolving the electrolyte and the monomer capable of providing a conductive polymer.

Examples of the solvent include acetonitrile, ethylene carbonate, propylene carbonate, nitrobenzene, nitromethane, benzonitrile, methanol, ethanol, and water. These solvents can be used alone or in combination.

The amount of the monomer to be used is generally about 0.0001 to 10 moles, preferably about 0.001 to 1 mole, per liter of the solvent.

The amount of the electrolyte to be used is generally about 0.0001 to 10 moles, preferably about 0.001 to 1 mole, per liter of the solvent.

The electrolytic polymerization is generally carried out by applying a voltage of about 1 mV to 100 V, and the quantity of electricity to be passed usually ranges from $1 \times 10^{-5}$ C/cm$^2$ (Coulombs/cm$^2$) to 100 C/cm$^2$. The quantity of electricity can be suitably selected depending on the desired thickness of conductive layer.

The thickness of the conductive layer depends on the intended use of the conductive resin composite, i.e., electric conductivity, as well as the ratio of the thickness of the conductive layer to the thickness of the general-purpose resin layer as mentioned above. The thickness of the conductive layer is generally in the range of about 0.001 μm to about 1 mm, preferably in the range of about 0.01 μm to about 0.1 mm.

In the method (1) comprising applying the conductive polymer solution on the internal surface or surfaces of the mold and evaporating the solvent, the thickness of the conductive layer can be controlled by the amount of the solution to be applied or the concentration of the conductive polymer in the solution.

In the method (2) comprising dissolving a monomer capable of providing a conductive polymer and an electrolyte in a solvent and subjecting the electrolytic solution to electrolytic polymerization using the mold component or components as electrodes, the thickness of the conductive layer can be controlled not only by the amount of the monomer but also by the quantity of electricity, as mentioned above.

General-purpose resin layer

The monomer which is polymerizable without condensation reaction to be used for forming the general-purpose resin layer in the present invention is a monomer which forms a polymer without release of a low molecular species in the course of polymerization, such as one capable of being polymerized by addition polymerization, polyaddition, cyclopolymerization, isomerization polymerization, ring-opening polymerization or the like.

Typical examples of such monomers include addition-polymerizable monomers such as methacrylic acid esters, particularly methacrylic acid $C_1$–$C_{20}$ alkyl esters, acrylic acid esters, particularly acrylic acid $C_1$–$C_{20}$ alkyl esters, styrene, vinyl acetate, vinyl chloride, vinylidene chloride and vinylidene fluoride; mixtures of polyols with polyisocyanates, which are used in the production of urethane resins; and glycidyl compounds, which are used in the production of epoxy resins.

Among the above monomers, addition-polymerizable monomers, particularly acrylic acid esters, methacrylic acid esters or a mixture of these are preferred. Also preferred is an addition-polymerizable monomer mixture comprising (a) at least one member selected from the group consisting of the above-exemplified acrylic acid esters and methacrylic acid esters and (b) one or more of other addition-polymeriable monomers, such as those exemplified above. Especially preferred is an addition-polymerizable monomer mixture comprising at least one member selected from the group consisting of the above acrylic acid esters and methacrylic acid esters in an amount of at least 50% by weight based on the weight of said addition-polymerizable monomer mixture.

The above monomer is used as previously supplemented with a catalyst, initiator or curing agent suitable for the polymerization or curing of the same. Herein, this mixture of said monomer, catalyst, initiator or curing agent, etc. is called "raw solution of the general-purpose resin". As the catalyst, initiator and curing agent, any reagents that are conventionally used can be employed. By way of illustration, when said addition-polymerizable monomer is used, the initiator that can be employed includes azo compounds such as azobisisobutyronitrile or azobisisovaleronitrile, organic peroxides such as lauroyl peroxide or t-butyl peroxy-2 -ethylhexanoate, inorganic peroxides such as $K_2S_2O_8$, and so on. When a polyol and a polyisocyanate are used as said monomers, the curing agent that can be employed includes tin compounds such as dibutyltin dimaleate, dibutyltin thiocarboxylate, and so on. When a glycidyl compound is employed, the catalyst may for example be acid anhydrides such as maleic anhydride, dicyandiamide, amines such as ethylenediamine or m-phenylenediamine, for instance.

The raw solution of the general purpose resin may further contain one or more additives such as coloring agents, light diffusers, reinforcing agents, fillers, parting agents, stabilizers, ultraviolet absorbers, antioxidants, antistatic agents, flame retardants, etc., if so desired.

The method of polymerizing the monomer which is polymerizable without condensation reaction is not specifically limited. Therefore, the polymerization can be conducted by a conventional polymerization method which is suitably selected depending on the type of the monomer to be used.

For example, when said addition-polymerizable monomer is used, a radical polymerization is conducted, depending on the type of the initiator or catalyst used, at a temperature effective for conducting the polymerization of a particular species of the monomer, generally at about 0°–100° C.

When said polyol and polyisocyanate are used, a reaction for forming polyurethane is carried out at a temperature effective for allowing the two reactants to react with each other, generally at about 0°–100° C., which may vary depending on the catalyst used.

When said glycidyl compound is used, the curing reaction is preferably carried out at a temperature which is suited to the curing agent used.

When UV irradiation is used for polymerization or curing, a sufficient amount of irradiation is used.

Following the above-mentioned polymerization, the mold or cell is disassembled to take out the product conductive resin composite.

EFFECTS OF THE INVENTION

Thus, in accordance with the present invention, electrically conductive composites can be manufactured without sacrificing the inherent characteristics of general-purpose resins.

Moreover, the method of the invention provides conductive polymer composites in a diversity of shapes and sizes and permits free control of the thickness of the conductive layer.

The conductive polymer composites prepared by the method of the present invention finds application as materials for antistatic materials, electromagnetic shields, electrodes, and so on.

EXAMPLES

The following examples are intended to describe the present invention in more detail and should by no means be construed as limiting the scope of the invention.

The evaluation parameters mentioned in the examples were determined by the following methods.

(1) The surface resistivity of the conductive polymer composites was measured with the electrical resistivity meter "Hiresta" (product of Mitsubishi Petrochemical Co., Ltd.).

(2) Concerning mechanical strength parameters, flexural strength and flexural modulus were measured in accordance with JIS K7203.

(3) As to the transparency, total light transmittance was measured in accordance with JIS K6718.

(4) The thickness of the conductive layer was measured with ERICHSEN GMBH & COKG's paint inspection gage P.I.G455 Model.

Example 1

In 1 liter of acetonitrile were dissolved 0.3 mole of $LiClO_4$ and 0.1 mole of pyrrole. This solution was introduced into an electrolytic polymerization reactor comprising two ITO-clad glass plate electrodes each having a surface area of 225 cm$^2$ and a surface resistivity of 100 Ω, and electrolytic polymerization of pyrrole was carried out by applying a voltage of 5 V to the electrodes and passing electric current until the quantity of electricity passed amounted to 1 C. Polypyrrole layer was thus formed on the anode ITO/glass plate.

A cell was prepared by interposing a 3 mm-thick polyvinyl chloride (PVC) gasket between this ITO/glass plate having the polypyrrole layer thereon and a non-coated glass plate having the same shape and size as the ITO/glass in such a manner that the polypyrrole layer was present inside of the cell.

A solution of 0.1 part by weight of azobisisobutyronitrile in 100 parts by weight of methyl methacrylate was introduced into the cell.

The cell was then immersed in a water bath at 70° C. for 3 hours and in an air bath at 120° C. for 1 hour to effect radical polymerization of methyl methacrylate.

Then, the cell was disassembled to provide a polymethyl methacrylate-polypyrrole composite having a thickness of 3 mm.

The composite thus obtained was evaluated. The composite had a surface resistivity of $3.8 \times 10^4$ Ω with respect to the polypyrrole layer surface, a flexural strength of 1200 kgf/cm$^2$, a flexural modulus of 32000 kgf/cm$^2$ and a total light transmittance of 85%.

The thickness of the conductive polymer layer was 1.0 μm.

Example 2

A polypyrrole layer was formed on the ITO glass plate in the same manner as in Example 1.

A cell was prepared by interposing a 10 mm-thick PVC gasket between the ITO/glass plate having the polypyrrole layer thereon and a non-coated glass plate having the same shape and size as the ITO/glass plate in such a manner that the polypyrrole layer was present inside of the cell.

A solution of 0.05 part by weight of azobisisobutyronitrile in 100 parts by weight of methyl methacrylate was introduced into the cell. The cell was then immersed in a water bath at 40° C. for 10 hours, at 60° C. for 5 hours and at 80° C. for 5 hours and in an air bath at 120° C. for 1 hour to effect radical polymerization of methyl methacrylate.

The cell was disassembled to provide a polymethyl methacrylate-polypyrrole composite having a thickness of 10 mm.

The composite thus obtained was evaluated. The composite had a surface resistivity of $3.8 \times 10^4$ Ω with respect to the polypyrrole layer surface, a flexural strength of 1210 kgf/cm$^2$, a flexural modulus of 32200 kgf/cm$^2$ and a total light transmittance of 80%.

The thickness of the conductive polymer layer was 1.0 μm.

Example 3

A 3 mm-thick polymethyl methacrylate-polypyrrole composite was prepared in the same manner as in Example 1 except that the quantity of electricity passed was increased to 3 C.

The composite thus obtained was evaluated. The composite had a surface resistivity of $1.0 \times 10^4$ Ω, a flexural strength of 1180 kgf/cm$^2$ with respect to the polypyrrole layer surface, a flexural modulus of 31500 kgf/cm$^2$ and a total light transmittance of 67%.

The thickness of the conductive polymer layer was 2.8 μm.

Example 4

A 3 mm-thick polymethyl methacrylate-polypyrrole composite was prepared in the same manner as in Example 1 except that stainless steel plates were used in lieu of the ITO/glass plates.

The composite thus obtained was evaluated. The composite had a surface resistivity of $8.5 \times 10^4$ Ω with respect to the polypyrrole layer surface, a flexural strength of 1220 kgf/cm$^2$, a flexural modulus of 32100 kgf/cm$^2$ and a total light transmittance of 82%.

The thickness of the conductive polymer layer was 1.0 μm.

Example 5

A 3 mm-thick polymethyl methacrylate-polythiophene composite was prepared in the same manner as in Example 1 except that 0.1 mole of thiophene was used in place of 0.1 mole of pyrrole and that the electrolytic polymerization was carried out at 20 V for 5 minutes.

The composite thus obtained was evaluated. The composite had a surface resistivity of $3.5 \times 10^5$ Ω with respect to the polythiophene layer surface, a flexural strength of 1170 kgf/cm$^2$, a flexural modulus of 31800 kgf/cm$^2$ and a total light transmittance of 77%.

The thickness of the conductive polymer layer was 1.2 μm.

Example 6

A 2 g quantity of poly(3-octhylpyrrole) was dissolved in 20 ml of dichloromethane. The solution was evenly applied to one surface of a glass plate, and the resulting coating was air-dried at room temperature for 24 hours and vacuum-dried at room temperature for 48 hours to form a poly(3-octylpyrrole) layer on the surface of the glass plate.

A cell was prepared by interposing a 3 mm-thick PVC gasket between the glass plate having the poly(3-octylpyrrole) layer thereon and a non-coated glass plate having the same shape and size as the coated glass plate in such a manner that the poly(3-octylpyrrole) layer was present inside of the cell.

A solution of 0.1 part by weight of azobisisobutyronitrile in 100 parts by weight of methyl methacrylate was introduced into the cell. The cell was then immersed in a water bath at 75° C. for 3 hours and in an air bath at 120° C. for 1 hour to effect radical polymerization of methyl methacrylate.

The cell was disassembled to provide a polymethyl methacrylate-poly(3-octylpyrrole) composite having a thickness of 3 mm.

The composite thus obtained was evaluated. The composite had a surface resistivity of $7.8 \times 10^4$ Ω with respect to the poly(3-octylpyrrole) layer surface, a flexural strength of 1180 kgf/cm$^2$, a flexural modulus of 31700 kgf/cm$^2$ and a total light transmittance of 80%.

The thickness of the conductive polymer layer was 1.5 μm.

Example 7

A poly(3-octylpyrrole) layer was formed on one surface each of two glass plates in the same manner as in Example 6.

A cell was prepared by interposing a 3 mm-thick PVC gasket between these two glass plates having a poly(3-octylpyrrole) layer thereon, in such a manner that both of the poly(3-octylpyrrole) layers were present inside of the cell.

A solution of 0.1 part by weight of azobisisobutyronitrile in 100 parts by weight of methyl methacrylate was introduced into the cell. The cell was then immersed in a water bath at 75° C. for 3 hours and in an air bath at 120° C. for 1 hour to effect radical polymerization of methyl methacrylate.

The cell was disassembled to provide a polymethyl methacrylate-poly(3-octylpyrrole) composite having a thickness of 3 mm, which had two conductive layers, one layer being formed on one surface of the polymethyl methacrylate layer and the other layer being formed on the other surface thereof.

The composite thus obtained was evaluated. The composite had a resistivity of $7.8 \times 10^4$ Ω with respect to both of the poly(3-octylpyrrole) layer surfaces, a flexural strength of 1210 kgf/cm$^2$, a flexural modulus of 32000 kgf/cm$^2$ and a total light transmittance of 68%.

The thickness each of the conductive polymer layers was 1.5 μm.

Example 8

A 2 g quantity of poly(3-sodium butanesulfonate thiophene) was dissolved in 20 ml of water. The solution was evenly applied to one surface of a glass plate, and the resulting coating was air-dried at room temperature for 24 hours and vacuum-dried at 80° C. for 48 hours to form a poly(3-sodium butanesulfonatethiophene) layer on the surface of the glass plate.

A cell was prepared by interposing a 3 mm-thick PVC gasket between the glass plate having the poly(3-sodium butanesulfonatethiophene) layer thereon and a non-coated glass plate having the same shape and size as the coated glass plate in such a manner that the poly(3-sodium butanesulfonatethiophene) layer was present inside of the cell.

A solution of 0.1 part by weight of azobisisobutyronitrile in 100 parts by weight of methyl methacrylate was introduced into the cell. The cell was then immersed in a water bath at 75° C. for 3 hours and in an air bath at 120° C. for 1 hour to effect radical polymerization of methyl methacrylate.

The cell was then disassembled to provide a polymethyl methacrylate-poly(3-sodium butanesulfonatethiophene) composite having a thickness of 3 mm.

The composite thus obtained was evaluated. The composite had a surface resistivity of $3.2 \times 10^5$ Ω with respect to the poly(3-sodium butanesulfonatethiophene) layer surface, a flexural strength of 1210 kgf/cm$^2$, a flexural modulus of 32100 kgf/cm$^2$ and a total light transmittance of 831%.

The thickness of the conductive polymer layer was 1.2 μm.

Comparative Example 1

In 0.1 liter of methyl methacrylate were dissolved 0.01 mole of LiClO$_4$, 0.005 mole of pyrrole and 0.5 mmole of azobisisobutyronitrile.

This solution was introduced into an electrolytic polymerization cell comprising two indium tin oxide (ITO)-clad glass plates (surface resistivity: 100 Ω; 12 cm×12 cm) having a 3 mm-thick PVC gasket interposed therebetween, and an electrolytic polymerization reaction was carried out by applying a constant voltage of 10 V to the ITO/glass electrodes until the quantity of electricity passed amounted to 1 C.

The electrolytic polymerization cell was then immersed in a water bath at 75° C. for 3 hours and in an air bath at 120° C. for 1 hour to effect radical polymerization of methyl methacrylate.

The cell was disassembled to provide a polymethyl methacrylate-polypyrrole composite having a thickness of 3 mm.

The composite thus obtained was evaluated. The composite had a surface resistivity of $3 \times 10^5$ Ω, a flexural strength of 1210 kgf/cm$^2$, a flexural modulus of 32100 kgf/cm$^2$ and a total light transmittance of 50%.

The thickness of the conductive polymer layer was 1.0 μm.

Comparative Example 2

A 3 mm-thick polymethyl methacrylate-polypyrrole composite was prepared in the same manner as in Comparative Example 1 except that the quantity of electricity passed was increased to 3 C.

The composite thus obtained was evaluated. The composite had a resistivity of $2.5 \times 10^4$ Ω, a flexural strength of 1205 kgf/cm$^2$, a flexural modulus of 32000 kgf/cm$^2$ and a total light transmittance of 35%.

The thickness of the conductive polymer layer was 3.0 μm.

In the following examples, the properties were measured as follows.

(1) The surface resistivity of the conductive polymer composites which was higher than $10^4$ Ω was measured by means of the foregoing electrical resistivity meter "Hiresta" (product of Mitsubishi Petrochemical Co., Ltd.) and the surface resistivity which was lower than $10^4$ Ω was measured with use of a digital multimeter ("Digital Multimeter 7562", product of Yokogawa Electric Corporation).

(2) As to electromagnetic wave shielding effect, transmission loss of electromagnetic wave was measured in a frequency range of 1–500 MHz using an electromagnetic wave shielding effect analyzer "TR17301A", product of Advantest Corporation.

Example 9

A 3 mm-thick polymethyl methacrylate-polypyrrole composite was prepared in the same manner as in Example 1 except that stainless steel plates having a surface area of 506.25 cm$^2$ were used in lieu of the ITO/glass plates and that a voltage of 2.5 V was applied until the quantity of electricity passed amounted to 32.4 C.

The composite thus obtained was evaluated. The composite had a polypyrrole surface resistivity of $3.38 \times 10^3$ Ω, a flexural strength of 1175 kgf/cm$^2$, a flexural modulus of 31400 kgf/cm$^2$ and a total light transmittance of 50%.

The electromagnetic wave shielding property of the composite was 25 dB at 1 MHz, 30 dB at 10 MHz, 10 dB at 100 MHz, 10 dB at 300 MHz, and 2 dB at 500 MHz.

Example 10

In 1 liter of acetonitrile were dissolved 0.3 mole of LiClO$_4$, 0.1 mole of pyrrole and 2.5 ml of water. This solution was introduced into an electrolytic polymerization cell comprising two ITO/glass plate electrodes each having a surface area of 1444 cm$^2$ and a surface resistivity of 5 Ω, and electrolytic polymerization of pyrrole was carried out by applying a voltage of 7.5 V to the electrodes until the quantity of electricity passed amounted to 2.31 C and then applying a voltage of 2.5 V until the quantity of electricity passed amounted to 6.93 C so that the total quantity of electricity was 9.24 C. A polypyrrole layer was thus formed on the surface of the anode ITO/glass plate.

Then, the corresponding subsequent procedures of Example 1 were followed to obtain a polymethyl methacrylate-polypyrrole composite having a thickness of 3 mm.

The composite thus obtained was evaluated. The composite had a surface resistivity of $5.2 \times 10^3$ Ω with respect to the polypyrrole layer surface, a flexural strength of 1150 kgf/cm$^2$, a flexural modulus of 31300 kgf/cm$^2$ and a total light transmittance of 72%.

The thickness of the conductive polymer layer was 1.0 μm.

The electromagnetic wave shielding property of the composite was 23 dB at 1 MHz, 28 dB at 10 MHz, 10 dB at 100 MHz, 8 dB at 300 MHz and 2 dB at 500 MHz.

Example 11

A 3 mm-thick polymethyl methacrylate-polypyrrole composite was prepared in the same manner as in Example 10 except that the electrolytic polymerization was carried out by applying a voltage of 7.5 V until the quantity of electricity passed amounted to 5.78 C and then by applying a voltage of 2.5 V until the quantity of electricity passed amounted to 17.33 C so that the total quantity of electricity was 23.11 C.

The composite thus obtained was evaluated. The composite had a surface resistivity of $1.8 \times 10^3$ Ω with respect to the polypyrrole layer surface, a flexural strength of 1190 kgf/cm$^2$, a flexural modulus of 31900 kgf/cm$^2$ and a total light transmittance of 61%.

The thickness of the conductive polymer layer was 2.6 μm.

The electromagnetic wave shielding property of the composite was 30 dB at 1 MHz, 40 dB at 10 MHz, 20 dB at 100 MHz, 15 dB at 300 MHz and 10 dB at 500 MHz.

What is claimed is:

1. A method of producing an electrically conductive polymer composite comprising a general-purpose resin layer and an electrically conductive layer comprising a conductive polymer, wherein the conductive layer is formed on at least one surface of the general-purpose resin layer, the method comprising the steps of forming the conductive layer on at least one internal surface of a mold, introducing into the mold a raw solution of the general-purpose resin comprising a monomer polymerizable without condensation reaction, wherein said monomer is at least one addition-polymerizable monomer selected from the group consisting of an acrylic acid ester and a methacrylic acid ester, and subjecting said monomer to polymerization in said mold to provide the general-purpose resin layer.

2. The method as claimed in claim 1 wherein the conductive layer is a layer of a conjugative polymer having a molecular skeleton wherein carbon-carbon or heteroatom-containing double or triple bonds are alternately arranged with single bonds.

3. The method as claimed in claim 2 wherein the conductive layer is composed of a polymer of a five-membered heterocyclic compound.

4. The method as claimed in claim 3 wherein the five-membered heterocyclic compound is at least one member selected from the group consisting of pyrrole, thiophene, furan, selenophene, tellurophene and isothianaphthene, each of which optionally have, on the ring structure thereof, at least one substituent selected from the group consisting of an alkyl group, a halogen atom, a hydroxyl group, a carboxyl group, an alkylene oxide group, an oxyalkyl group and an alkylsulfonic acid group.

5. The method as claimed in claim 4 wherein the five-membered heterocyclic compound is pyrrole, which optionally has, on the ring structure thereof, at least one substituent selected from the group consisting of an alkyl group, a halogen atom, a hydroxyl group, a carboxyl group, an alkylene oxide group, an oxyalkyl group and an alkylsulfonic acid group.

6. The method as claimed in one of claims 1–5 wherein the conductive layer is formed on the internal surface of the mold by subjecting to electrolytic polymerization a solution containing said monomer which provides said conductive polymer and an electrolyte using the constituent component of the mold as electrodes.

7. The method as claimed in claim 2 wherein the conductive layer is composed of a polymer of an aromatic compound.

8. The method as claimed in claim 7 wherein the aromatic ring has at least one six-membered aromatic compound.

9. The method as claimed in claim 8 wherein the aromatic compound is at least one member selected from the group consisting of benzene, biphenyl, naphthalene, anthracene, azulene, pyrene, carbazole, pyridazine and aniline, each of which optionally have, on the ring structure thereof, at least one substituent selected from the group consisting of an alkyl group, a halogen atom, a hydroxyl group, a carboxyl group, an alkylene oxide group, an oxyalkyl group and an alkylsulfonic acid group.

10. The method as claimed in claim 1 wherein the conductive layer is formed on at least one internal surface of the mold by applying a solution of the conductive polymer in a solvent to said at least one internal surface of the mold and evaporating the solvent.

11. The method as claimed in claim 1 wherein the addition-polymerizable monomer is a monomer mixture comprising at least 50% by weight of said at least one member selected from the group consisting of an acrylic acid ester and a methacrylic acid ester.

* * * * *